(12) United States Patent
Lin

(10) Patent No.: US 10,042,947 B2
(45) Date of Patent: Aug. 7, 2018

(54) READ-ONLY METHOD AND SYSTEM FOR OPERATING PORTABLE DEVICES

(71) Applicant: SunASIC Technologies, Inc., New Taipei (TW)

(72) Inventor: Chi-Chou Lin, New Taipei (TW)

(73) Assignee: Sunasic Technologies, Inc., New Taipei (TW)

( * ) Notice: Subject to any disclaimer, the term of this patent is extended or adjusted under 35 U.S.C. 154(b) by 550 days.

(21) Appl. No.: 14/527,956

(22) Filed: Oct. 30, 2014

(65) Prior Publication Data

US 2016/0125091 A1    May 5, 2016

(51) Int. Cl.
G06F 17/00    (2006.01)
G06F 17/30    (2006.01)

(52) U.S. Cl.
CPC .. G06F 17/30896 (2013.01); G06F 17/30094 (2013.01)

(58) Field of Classification Search
None
See application file for complete search history.

(56) References Cited

U.S. PATENT DOCUMENTS

| | | | | |
|---|---|---|---|---|
| 7,085,817 B1 * | 8/2006 | Tock | ................. | G06F 17/30902 707/E17.12 |
| 8,694,598 B2 * | 4/2014 | Ittah | ........................ | G06F 21/79 709/203 |
| 8,924,556 B2 * | 12/2014 | Hershko | ............... | H04L 61/106 455/406 |
| 8,990,404 B2 * | 3/2015 | Murrett | ............... | H04L 65/1069 370/254 |
| 2005/0010656 A1 * | 1/2005 | Lee | ......................... | H04L 29/06 709/223 |
| 2006/0085499 A1 * | 4/2006 | Zhu | ................... | H04M 1/72525 709/203 |
| 2008/0178290 A1 * | 7/2008 | Besch | ...................... | G06F 21/53 726/22 |
| 2008/0281884 A1 * | 11/2008 | Subrahmanyam | ........ | G06F 8/61 |
| 2010/0235830 A1 * | 9/2010 | Shukla | ................ | G06F 9/44526 718/1 |
| 2010/0251084 A1 * | 9/2010 | Yoshida | ................ | G06F 9/4443 715/205 |
| 2011/0119600 A1 * | 5/2011 | Liu | ................... | H04M 1/72561 715/760 |
| 2011/0179204 A1 * | 7/2011 | Hulbert | ................. | G06F 3/0219 710/74 |
| 2013/0002540 A1 * | 1/2013 | Ajitomi | ............. | G06F 17/30867 345/156 |
| 2014/0033057 A1 * | 1/2014 | Zhang | ................... | H04W 48/20 715/738 |
| 2014/0108471 A1 * | 4/2014 | Liu | ................... | G06F 17/30115 707/823 |
| 2014/0258441 A1 * | 9/2014 | L'Heureux | ........... | H04W 12/06 709/217 |

* cited by examiner

*Primary Examiner* — Mustafa A Amin
(74) *Attorney, Agent, or Firm* — Che-Yang Chen; Law Offices of Scott Warmuth (57) ABSTRACT

A read-only method and a read-only system for operating a portable device are disclosed. The system includes a portable device which has a memory unit and a processing unit, and a host which has a display unit and a processor. A browser requests an access to a portable device inserted to a host. After the storage units been accessed are traced, corresponding service will be performed by the portable device without being blocked by the security system of the host.

15 Claims, 8 Drawing Sheets

| Service / Option Property | URL |
|---|---|
| Initiating FFD | file://s:/A1/A2/A3/1.txt <br> .... <br> file://s:/A1/A2/A3/100.txt |
| Configuring FFD | file://s:/B1/B2/B3/1.txt <br> .... <br> file://s:/B1/B2/B3/100.txt |
| Performing Fetching a Fingerprint | file://s:/C1/C2/C3/1.txt <br> .... <br> file://s:/C1/C2/C3/100.txt |
| Providing a Fetched Fingerprint Image | file://s:/D1/D2/D3/1.txt <br> .... <br> file://s:/D1/D2/D3/100.txt |
| Cutting-off Connection of FFD | file://s:/E1/E2/E3/1.txt <br> .... <br> file://s:/E1/E2/E3/100.txt |

| Service / Option Property | URLs |
|---|---|
| Initiating FFD | file://s:/A1/A2/A3/1.html and file://s:/E1/E2/E3/1.html |
| Configuring FFD | file://s:/B1/B2/B3/1.txt and file://s:/F1/F2/F3/1.html |
| Performing Fetching a Fingerprint | file://s:/C1/C2/C3/1.txt and file://s:/G1/G2/G3/1.html |
| Providing a Fetched Fingerprint Image | file://s:/D1/D2/D3/1.html and file://s:/H1/H2/H3/1.html |
| Cutting-off Connection of FFD | file://s:/E1/E2/E3/1.html and file://s:/I1/I2/I3/1.html |

READ-ONLY METHOD AND SYSTEM FOR OPERATING PORTABLE DEVICES

FIELD OF THE INVENTION

The present invention relates to a read-only method and a system. More particularly, the present invention relates to a read-only system and method for operating portable devices.

BACKGROUND OF THE INVENTION

Some portable devises need to be setup or initialized before they can start to function. For example, a fingerprint secured FLASH disk asks users to register their fingerprints information to the device before the security functions take effect. Since the fingerprint secured FLASH disk has no user interface for user interaction, it must have the help from a host, e.g., a computer. Usually, software is required to be installed or executed on the host so that the related initialization processes can be done.

If a computer is used to run the software, there is a problem for the manufacturer of the fingerprint secured FLASH disk. For each supported Operating systems (OS), the manufacturer has to provide corresponding version of software. This is an excessive cost.

There is a commonly used method to settle the problem mentioned above. Instead of software that must be installed and executed on the host, an HTML file is delivered to a web browser on the host so that it can interact with users and lead them to an on-line webpage for further set-ups or locally finish the same initialization process. However, for some portable devices, running such HTML file(s) in the web browser to interact with the attached device may be blocked off by the OS's security system. For example, if a HTML file provided by the fingerprint FLASHFLASH disk asks to write information to the FLASH disk when it is linked to the computer, the host's security system may pop up a warning message to alert the user that there is a potential security risk since the default settings of the browser security feature denies any attempt of data writing to local file system. It is obvious that the fingerprint FLASH disk is deemed as a local storage device to the computer. Most people don't understand how the security system works and think there is a security threat from the fingerprint FLASH disk. It will bring a lot of telephone inquiries, or even call-backs.

Therefore, here comes a demand that how to setup or initialize a portable device which is linked to a host without being challenged by the security system. The U.S. Pat. No. 7,676,675 gives us a teaching. By thinking the portable device as a remote client who wants to access a local desktop, '675 have processes to implement the demand. However, '675 requires an additional listening socket to be set up in both sides. It may not be acceptable for the user who bought the portable device.

The inventor came out an accurate but simple read-only method and a system using the method to operate the portable devices. The system is across both the device side and host side so that available elements in the host side can be utilized without new elements installed. The above mentioned demand can be fulfilled.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

According to an aspect of the present invention, a portable device includes: a memory unit, having a file system directory and an HTML file embedded with a program programmed by a scripting language or a programming language, or an application file embedded with or referring to an operation, for storing data in a physical and/or virtual memory space; and a processing unit, for transmitting the HTML file or application file from the memory unit, running a monitoring program, processing a service that the monitoring program requests and delivering data in address; and a host, linked by the portable device, receiving the HTML file or application file, comprising: a display unit, for showing web pages on a browser which displays contents of the HTML file and executes the embedded program, or displaying results of the application file; and a processor, for running an operating system (OS), and the browser or the application file.

The host deems the portable device as a storage device that the file system directory structure indicates. The browser installed in the host processes the HTML file and executes the embedded program. The embedded program or application file runs to translate an option property selected or a message entered by a user for a service to a corresponding Uniform Resource Locator (URL) or a combination of URLs that refers to a file or files located in the file system directory respectively. The operating system accesses the file or files by seeking an address of the file or addresses of the files in an index table of the file system directory and then requesting the portable device to read data at that address(es). The monitoring program checks the addresses issued from the operating system and determines whether the addresses correspond to the service. If the monitoring program finds that the addresses correspond to the service, it informs the processing unit to carry out the service. The address(es) provided by the file system directory is an index number of a memory space in the portable device.

Preferably, the file system directory is FAT, FAT16, FAT32, exFAT, NTFS, ext2, ext3, ext4, HFS, HFSX, or ISO 9660. The index table of the file system directory is File Allocation Table in FAT file system, index node (inode) in Extended file system, or Master File Table in NTFS. The minimum read/write unit is a page in a NAND FLASH chip, FLASH disk or a SOLID-STATE DRIVE (SSD). The minimum read/write unit is a block in a hard disk. The monitoring program has a preset table of minimum read/write units corresponding to services. The program or application runs to interact with the user for taking the selection or input message. The option property is shown in the web browser in form of an option button, a check box or a drop-down menu. The option property is shown on a webpage in the web browser in form of a piece of image which can trigger one specified service if it is clicked on. The message is entered by a user from a text input field on the web browser. The script language is JAVASCRIPT or a language used by HTML5. The service comprises initiating the portable device, configuring the portable device, performing an action of the portable device, and providing a piece of message in the portable device or cutting-off the connection with the host.

According to the present invention, the portable device is linked to the host via a wireless or wired connection. The wireless connection utilizes a WI-FI module or a BLUETOOTH module. The wired connection uses a USB connector, a SD card slot, an E-SATA connector, a LIGHTING connector or a THUNDERBOLT connector. The portable device is a hard disk, a FLASH disk, a SSD, a fingerprint reader or a fingerprint FLASH disk. The host is a desktop computer, a laptop computer, a tablet or a smart phone. The display is a monitor, a screen or a touch screen. The host further comprises an input device for selecting the service option. The input device is a mouse, a keyboard or a touch screen.

According to another aspect of the present invention, a read-only method for operating a portable device includes the steps of: connecting a host with a portable device; providing a file system directory and an HTML file embedded with a program to an operating system of the host from the portable device; initiating a browser to run the program in the HTML file by the operating system; entering a message or selecting an option to an interface of the browse; translating the option property and/or the message into a URL or a combination of URL(s); translating the URL(s) into a reading action by the operating system; accessing a file or flies located in the file system directory referred by one URL or URLs by seeking one address of the file or addresses of the files in an index table of the file system directory and then requesting the portable device to read data at that address; monitoring address(es) accessed during the access of the file or files in the portable device; finding a service that corresponds to the accessed address(es) in the portable device; and performing the service by the portable device.

DETAILED DESCRIPTION OF THE PREFERRED EMBODIMENTS

The present invention will now be described more specifically with reference to the following embodiments.

Figure 1:
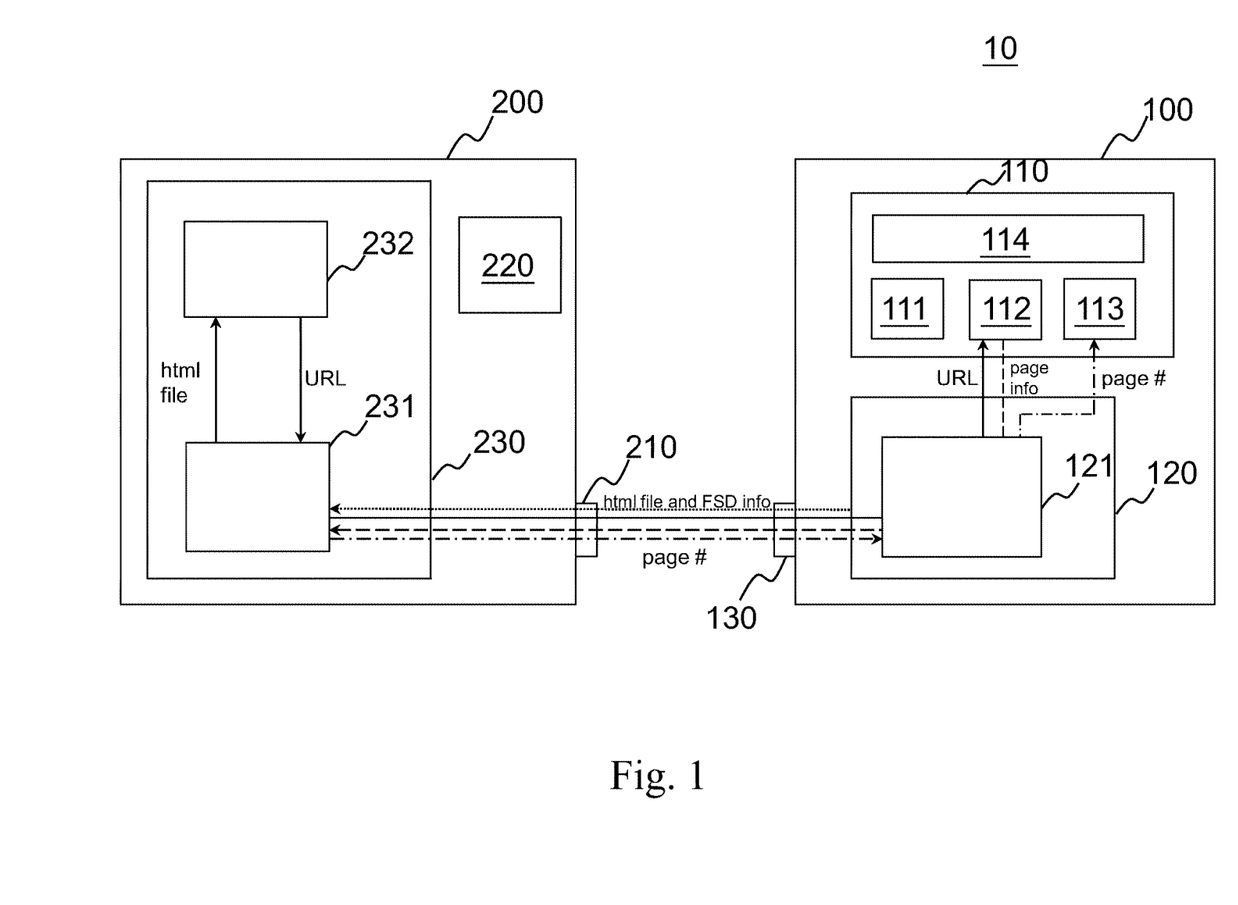
FIG. 1 is a block diagram of a read-only system according to the present invention.

Please refer to FIG. 1. An embodiment of a read-only system 10 according to the present invention is disclosed. The read-only system 10 is used to operate a portable device. A fingerprint FLASH disk 100 is taken for an example as the portable device. For the fingerprint FLASH disk 100, a user needs to register his fingerprints in the fingerprint FLASH disk 100 with the help of a host, a laptop computer 200, before it can work. The read-only system 10 is a good example to initiate the fingerprint FLASH disk 100 without a block-off from the security system in the laptop computer 200.

As mentioned above, the read-only system 10 provided in the present invention is across the device side and host side. Therefore, at least a portion of the laptop computer 200 should have corresponding functions which will be illustrated later. For a common laptop computer, those functions are handled by specified elements, e.g., a processor or modularized chip set. The present invention just utilizes available electronic components to fulfill the read-only system 10. The key part is in the fingerprint FLASH disk 100.

The fingerprint FLASH disk 100 includes three important units, a memory unit 110, a processing unit 120 and a USB connector 130. It can also have other parts to process functions of a fingerprint reader and a FLASH disk, but they are not the topic to discuss in the present embodiment. The fingerprint FLASH disk 100 can be accessed by the operating system of the laptop computer 200.

The memory unit 110 has an HTML file 111 and a file system directory 112. The HTML file 111 offers information to users through a display and interacts with users by making selection it provides or entering a text message therefrom. It is embedded with a program which is programmed by a scripting language or a programming language. The program can translate the user selection or text message to a corresponding Uniform Resource Locator (URL) or a combination of URLs (this will be described in details later). Java script is preferred as the scripting language. As to the programming language, C++ and Java are commonly used. In practice, the HTML file can be replaced by an application file embedded with or referring to an operation. No matter which one is used, as long as the functions of the used one fulfill the requirement of the present invention, the memory unit 110 can store it.

Main function of the memory unit 110 is to store data. Please see FIG. 1 again. Some data can be store in free memory space 114 for access. It is noticed that there is an occupied memory space 113 in the memory unit 110. The occupied memory space 113 stores only some preset data for operating read-only function. No other data should be stored here. The occupied memory space 113 in a physical and/or a virtual memory space. If the occupied memory space 113 is virtual memory space, each minimum read/write unit may contain only a header of a file and the whole virtual memory space may be described by a simulating program to make an operating system of the laptop computer 200 believe there are such data in the occupied memory space 113. Of course, the occupied memory space 113 can be partial physical memory space and partial virtual memory space depending on its design. It should be emphasized that the minimum read/write unit is a page in a NAND FLASH chip used by the memory unit 110. If the present invention is applied to other portable devices, such as a FLASH disk or a SOLID-STATE DRIVE (SSD), one page still works as the minimum read/write unit. However, if the present invention is applied to portable devices with a hard disk as the memory unit 110, the minimum read/write unit should be a block.

The file system directory 112 indicates a file system having layers of sub-directories and logical files stored and corresponding physical locations somewhere in the memory unit 110. The file system provides the pages in the occupied memory space 113 and the free memory space 114 indexed by unit numbers. The file system directory 112 is implemented by a conventional File Allocation Table (FAT) or an FAT equipped with a FLASH Transition Layer (FTL). In fact, the file system directory 112 can also be FAT16, FAT32, exFAT, NTFS, ext2, ext3, ext4, HFS, HFSX, or ISO 9660. For operation of the read-only system 10, the file system directory 112 must have data stored in many layers. This is because the spirit of the present invention is to observe the access of some specified pages to determine a corresponding service to take effect. If the preset data, e.g. a text file, is obtained by cache of the operating system so that access of the pages is not available, no matter the file is opened or not, the read-only system 10 fails to operate correctly. In the embodiment, a virtual memory space in the occupied memory space 113 is used. Thus the file system is also an emulated file system that the file system directory 112 makes the operating system believe the file system is there but it doesn't exist. Similarly, if physical memory space is used, the file system is a normal file system with actual FAT and stored data. As mentioned above, the occupied memory space 113 can be partial physical memory space and partial virtual memory space. A mixed physical and emulated file system is used. Structure of the virtual memory space will be described later.

The processing unit 120 is used to transmit the HTML file from the memory unit 110 to the laptop computer 200. It can also run a monitoring program 121 and process a service that the monitoring program 121 requests. Meanwhile, the processing unit 120 can deliver the data in the pages in the memory unit 110 (address) upon the request from the laptop computer 200. The USB connector 130 is a wired connection of transmitting the HTML file. Actually, it can be other connector, such as an E-SATA connector. It can also be a wireless connection for transmitting. The wireless connection may be implemented by a WI-FI module or a BLUETOOTH module.

The host, laptop computer 200, is linked by the fingerprint FLASH disk 100 and receives the HTML file (or the application file if used). As mentioned above, although there are many electronic components in the laptop computer 200, only three of them are required and have specific functions. They are a USB port 210, a display unit 220 and a processor 230. It is clear that the USB port 210 is used to connect with the USB connector 130 and pass the data from the USB connector 130 to the processor 230. If the USB connector 130 is changed to an E-SATA connector, the USB port 210 can be replaced by an E-SATA port. It can also be RF solution if the USB connector 130 is replaced by a corresponding module, a WI-FI module or a BLUETOOTH module.

The display unit 220 may show web pages on a browser. The browser displays contents of the HTML file. It also executes the embedded program (or displays results of the application file if any). The purpose of the display unit 220 is to facilitate an interaction between users and the read-only system 10. The processor 230 is used to run the operating system and the browser (or the application file). It can be a general central processing unit in the laptop computer 200. In order to facilitate reading of the description, the operating system and browser are symbolized 231 and 232, respectively. The operating system 231 can perform network service when one URL requested from the browser 232 is for web pages (http). The URL can also be used for file transfer (ftp), email (mailto) and many other applications. The operating system 231 also provides file service according to file system directory information, to translate a directory path of a file into a page number for accessing the occupied memory space 113 and the free memory space 114. Therefore, access of pages is achieved.

Figure 2:
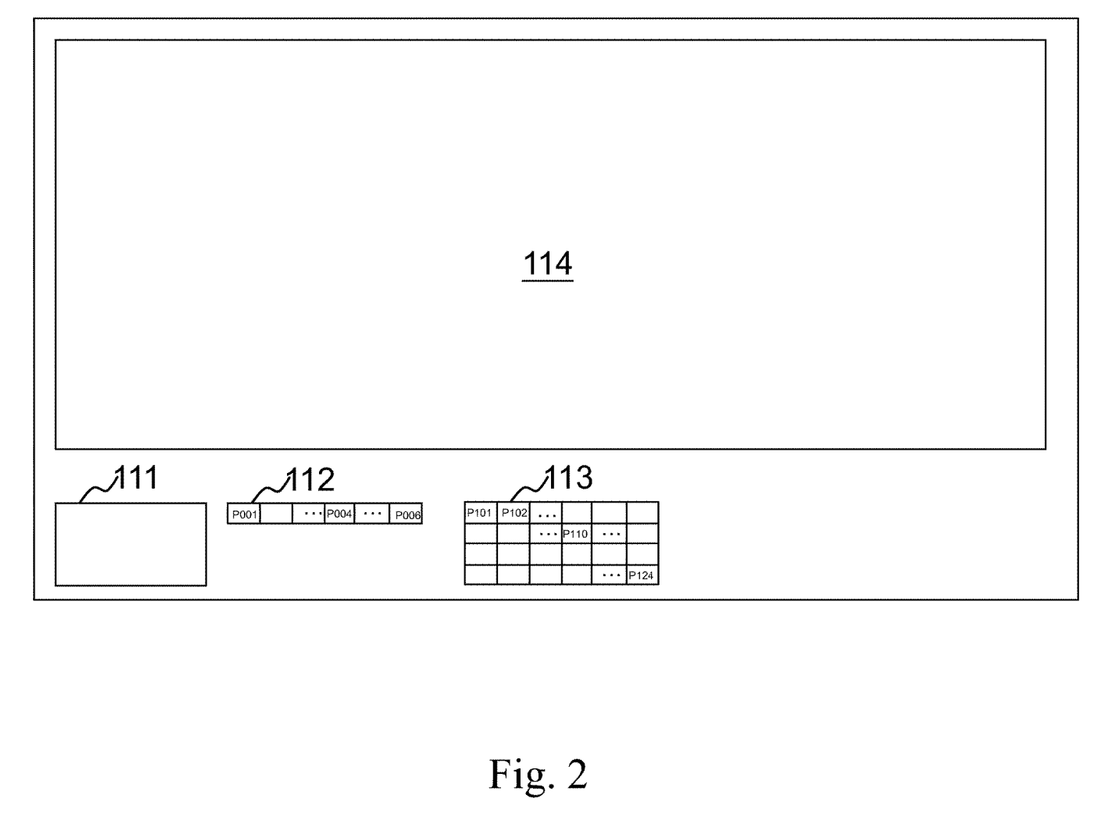
FIG. 2 shows a detailed structure of a memory unit in the embodiment.

The laptop computer 200 deems the fingerprint FLASH disk 100 as a storage device that the file system directory 112 indicates. Since a virtual memory space is used, the content of the occupied memory space 113 doesn't have to exist physically. For a better understanding, please refer to FIG. 2. FIG. 2 shows a detailed structure of the memory unit 110. The file system directory 112 keeps corresponding relationships between logical files (directory paths) and virtual memory space (pages). For example, the page P001 records corresponding relationship for data which don't exist but with headers and some information stored in pages P101 and P102. If URLs are requested to access the non-existing data, the data in the page P001 will feedback the page numbers of P101 and P102 to the operating system 231 so that the operating system 231 will try to fetch the data in the pages P101 and P102. Similarly, the page P004 feedbacks pages P110 and page P006 feedbacks pages P124, respectively, if corresponding URLs request.

When the laptop computer 200 is linked to the fingerprint FLASH disk 100 by connecting the USB port 210 and the USB connector 130, the fingerprint FLASH disk 100 is powered by the laptop computer 200. After several seconds, the processing unit 120 will send the HTML file (or application file) and file system directory information (the dot line with arrow shown in FIG. 1) to the operating system 231. When the operating system 231 receives the HTML file, the browser 232 installed in the computer 200 will process the HTML file and executes the embedded program automatically.

The content of the HTML file provides a browser interface with a number of option properties to users. Each option property corresponding to a service that the fingerprint FLASH disk 100 performs once selected. The service, through which the fingerprint FLASH disk 100 receives and executes command/message from the user, comprises initiating the fingerprint FLASH disk 100, configuring the fingerprint FLASH disk 100, performing an action of the fingerprint FLASH disk 100, providing a piece of message in the fingerprint FLASH disk 100 or cutting-off the connection with the laptop computer 200 from the fingerprint FLASH disk 100. Other services can be introduced. It is not limited by the present invention. For illustration purpose, all of the services will be used in an operating example later.

Once an option property is selected or a message is entered by a user, the embedded program (or application file) runs to translate the option property to a specified URL or a combination of URLs. The URL(s) can be referred to a file or files located in the file system directory 112, respectively. The operating system 231 accesses the file of files by seeking an address of the file or addresses of the files in an index table of the file system directory 112 and then requesting the fingerprint FLASH disk 100 to read data at that address(es). The address of the file system directory 112 is an index number of a memory space in the fingerprint FLASH disk 100, e.g. one page. Here, the index table of the file system directory is File Allocation Table in FAT file system. In practice, it can be index node (inode) in Extended file system, or Master File Table in NTFS. Please see FIG. 1 again. When the operating system 231 seeks with one URL in the index table of the file system directory 112 (the solid line with an arrow in FIG. 1), page P001 is found in this address. Then, the file system directory 112 feedbacks that the data the URL indicates is stored in pages P101 and P102 (the dashed line with an arrow in FIG. 1). Finally, the operating system 231 accesses pages in the occupied memory space 113 with numbers of P101 and P102 (the dot-dashed line with an arrow in FIG. 1) in form of requesting the fingerprint FLASH disk 100 to read the data. Total 3 pages are accessed. It is possible two pages are accessed if the specified data that URL indicates is stored in one page. In this example, the data which occupies two pages may have a larger size or may be logically stored in the emulated file system with many layers of sub-directories.

The monitoring program 121 monitors processes of page access. If a page access is to a physical memory space of the file system directory 112, it does normal file access. On the contrary, if a page access is to a virtual memory space of the file system, it translates the pages been accessed to one corresponding service. The monitoring program checks the addresses issued from the operating system and determines whether the addresses correspond to the service; if the monitoring program finds that the addresses correspond to the service, it informs the processing unit to carry out the service; the address(es) provided by the file system directory is an index number of a memory space in the portable device.

The monitoring program 121 has a preset table of pages (or rule) relating the addresses to corresponding services. The monitoring program 121 checks the addresses issued from the operating system 231 and determines whether the addresses correspond to the service. If the monitoring program finds that the addresses correspond to the service, it informs the processing unit to carry out the service. If the monitoring program 121 finds that the addresses correspond to the service, it informs the processing unit 120 to carry out the service.

The option property may be selected or a message entered by a user through the browser 232. The message is inputted from a text input field on the browser 232. The message has the same function as the option property. In fact, selections of the option properties are shown in the browser 232 in form of an option button, a check box or a drop-down menu. They can also be shown in form of a piece of image which can trigger one specified service if it is clicked. This is not limited by the present invention. The purpose of the program (or application) is to run to interact with the user for taking the selection or input message.

Figure 4:
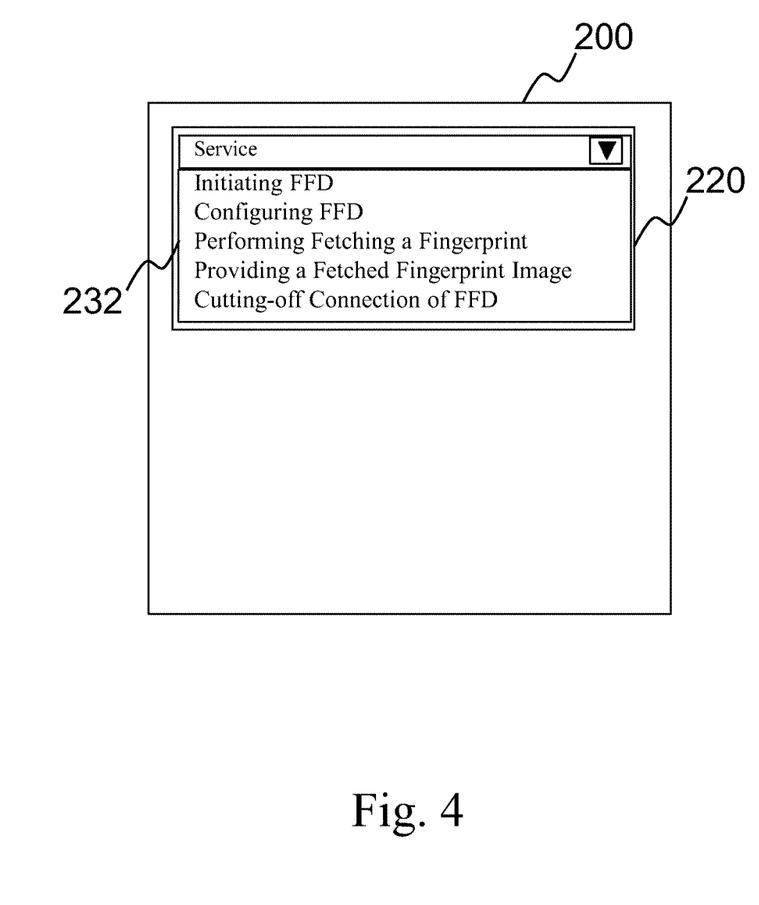
FIG. 4 shows a browser in a display unit.
Figure 5:
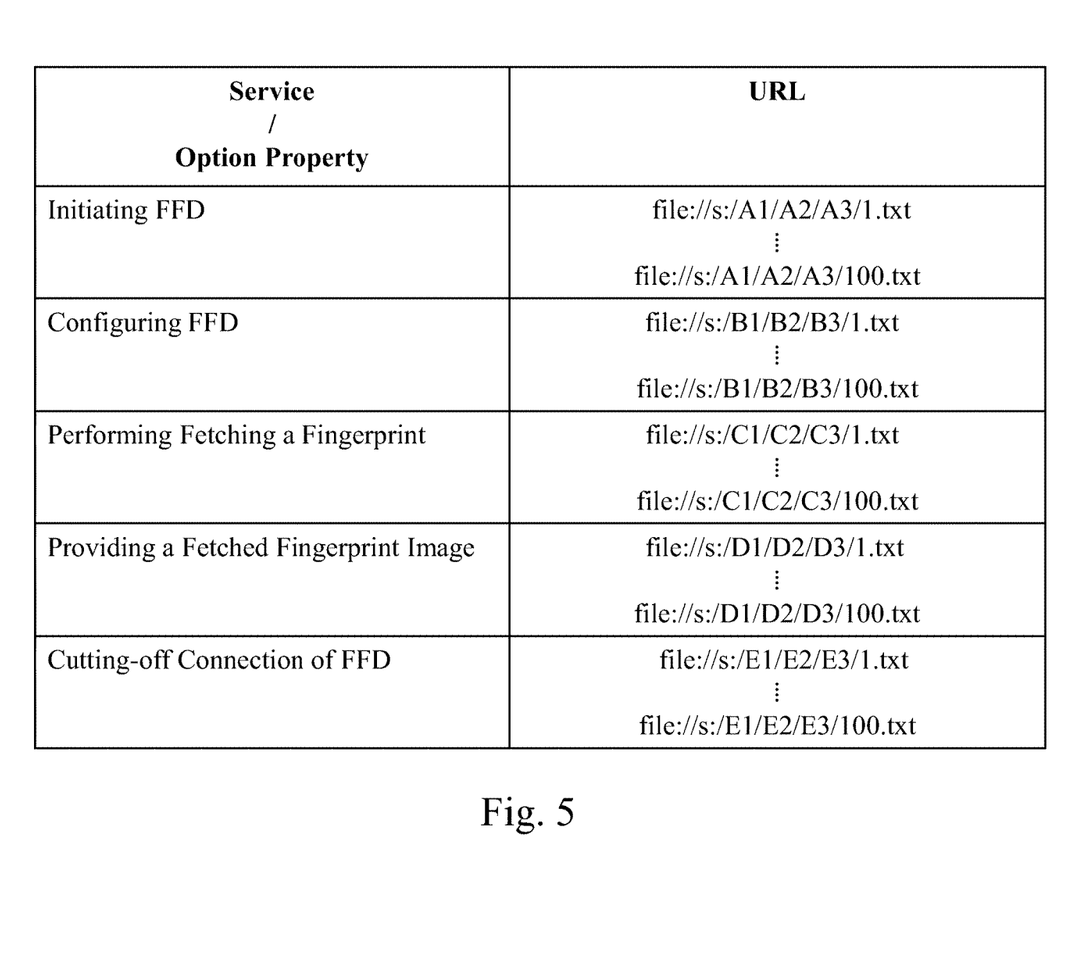
FIG. 5 shows a preset table for URLs.

Below is the operating example. Please see FIG. 4. The display unit 220 shows a browser 232 which has the option properties mentions above (Initiating the Fingerprint FLASH disk (FFD), Configuring the FFD, Performing Fetching a Fingerprint, Providing a Fetched Fingerprint Image and Cutting-off Connection of the FFD). The corresponding services are shown in a drop-down menu. When one option property is selected in the browser 232, the operating system 231 of the laptop computer 200 will access one URL according to the preset table of URL. Please refer to FIG. 5. It shows a structure of some files in the virtual memory space. The fingerprint FLASH disk 100 is deemed as a local drive by the laptop computer 200. There are five root directories, A1, B1, C1, D1 and E1. Each root directory has many subdirectories. For example, the root directory A1 has a subdirectory A2 and a subdirectory A3 of subdirectory A2. In the subdirectory A3, there are 100 files. Other root directories have similar structure. The whole files in the virtual memory space will look like what illustrates in FIG. 6.

One option property corresponds to some specific URLs. Since one file that a URL refers to might be cached by the operating system 231 of the laptop computer 200 once the URL is initiated by the operating system 231 to access the file, according to the spirit of the present invention, the used URL will be abandoned and another specific URL will be ready for the next access for the same option property. For example, when a user selects "Initiating FFD" to initiate the fingerprint FLASH disk 100 through the browser 232 at the first time, in accordance with the preset table of URL, the operating system of the laptop computer 200 will access file://s:/A1/A2/A3/1.txt. Then, the monitoring program 121 will know the file the URL refers is accessed. The monitoring program 121 will inform processing unit 120 to initiate the fingerprint FLASH disk 100 to use. If the fingerprint FLASH disk 100 is requested to redo "Initiating FFD" again, the same processes will run. However, at the second time, the URL changes to file://s:/A1/A2/A3/2.txt. Corresponding pages be accessed will not be used twice. Theoretically, there are 100 times of selection of the same option property until all URLs are used out. If the maker of the fingerprint FLASH disk 100 expects that it might be reset for many times, the URLs can be more. According to the present invention, if the fingerprint FLASH disk 100 is pulled out and plugged into another computer, the used URL(s) can be used again. This is because the file system directory information is new for the computer (even new for the laptop computer 200 after being pulled and plugged again into the laptop computer 200). Cached files won't link to the same pages it is from.

Figure 6:
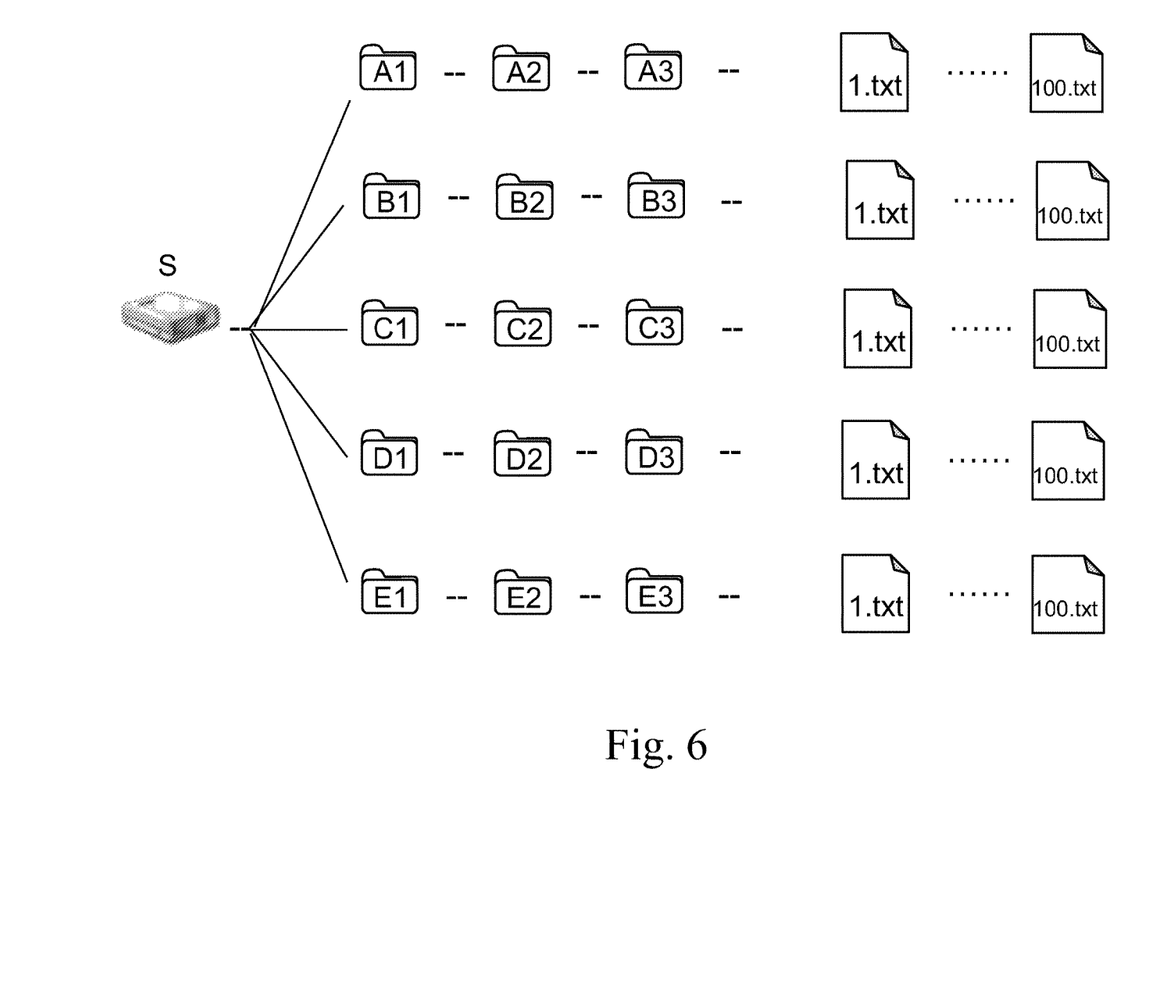
FIG. 6 is a file system directory of the URLs.

It should be emphasized that it doesn't matter whether the file that URL indicates is read or not. The operating system 231 doesn't have to read it. The browser 232 might be set to ignore the feedback from the occupied memory space 113. Number of the layers of directories is not to be 3 as shown in FIG. 6. It can be more than three. It can be another arrangement of the file system directory 112 that one file is located at a certain level while the file for the next access is at a level lower than that one. For example, the URL for the first time to select Performing Fetching a Fingerprint is file://s:/C1/C2/C3/1.txt while the second time to select the same option property is file://s:/C1/C2/C3/C4/2.txt. The third time would be file://s:/C1/C2/C3/C4/C5/3.txt. A4 is a subdirectory of the C3 and C5 is a subdirectory of the C4.

Figure 7:
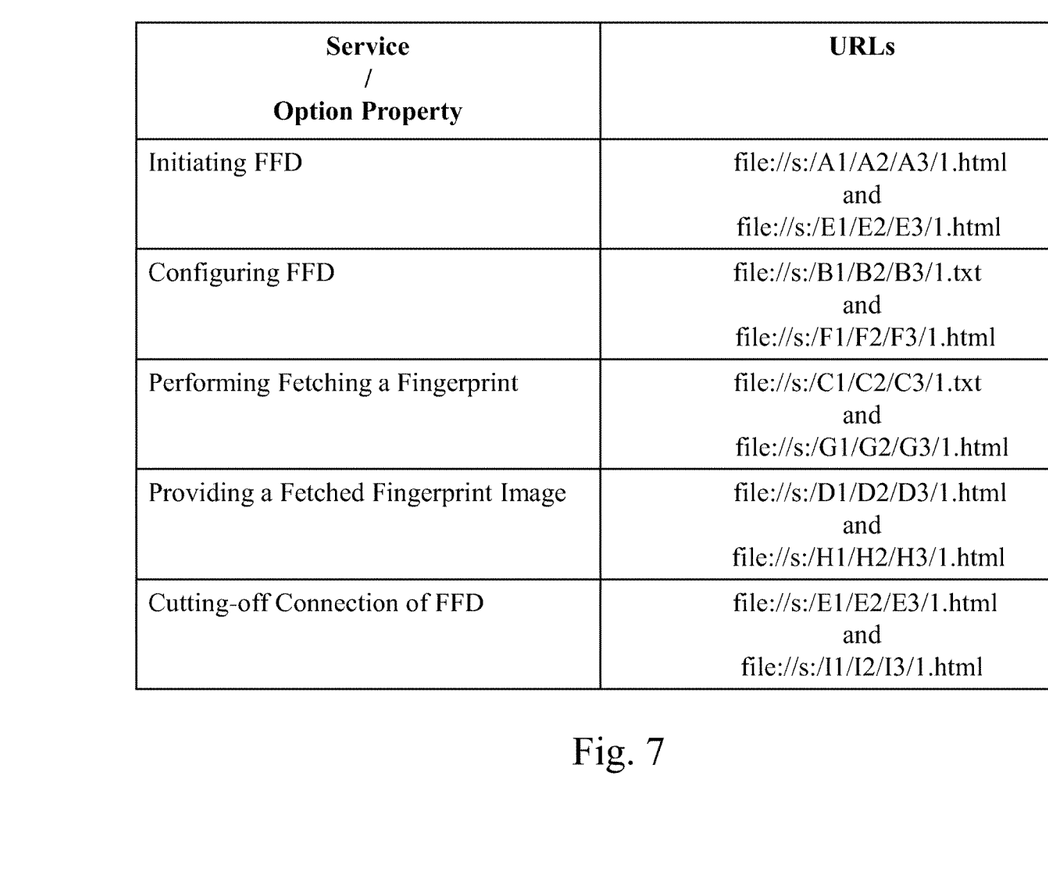
FIG. 7 shows another preset table for URLs.

Of course, the URLs don't have to refer to a texture file. It can refer to other kind of file, e.g. an HTML file. Meanwhile, the monitoring program 121 can trace more than one URL for one option property and then the corresponding service can be carried out. Another embodiment is shown in FIG. 7. In this embodiment, an option property refers to two URLs. Namely, once an option property is selected, the operating system of the laptop computer 200 will access pages for two different URLs. For example, if one user selects "Cutting-off Connection of FFD", the URLs of file://s:/E1/E2/E3/1.HTML and file://s:/I1/I$_2$/I3/1.HTML will be accessed. Then the monitoring program traces it out and the corresponding service will be done. Also, there are a lot of URLs (not shown) correspond to one option property. The used URLs will be abandoned like the previous embodiment.

In the previous embodiments, virtual memory space and emulated file system are applied. Meanwhile, the portable device is fingerprint FLASH disk and contains non-violated memories. A portage device having a hard disk as a memory unit can be used according to the present invention.

Figure 3:
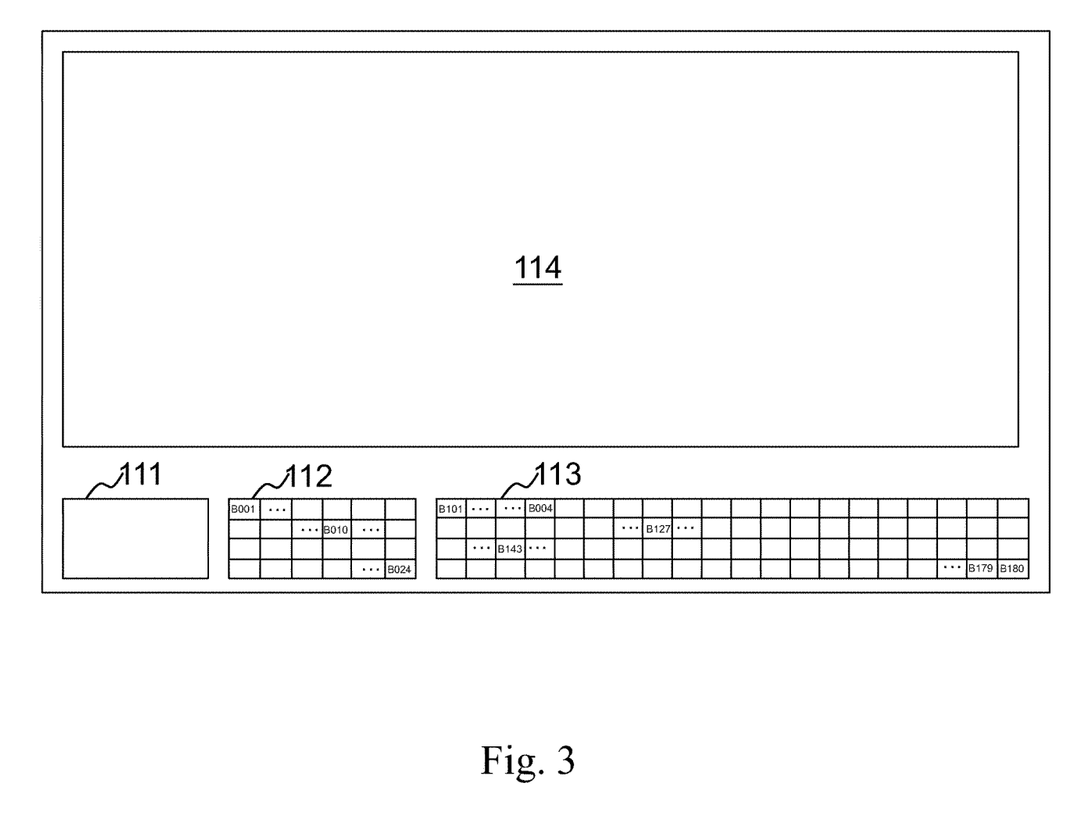
FIG. 3 shows another detailed structure of a memory unit.

Please see FIG. 3. The fingerprint FLASH disk 100 is replaced by a fingerprint hard disk. Therefore, the memory unit 110 is read and written in "blocks". Since a physical memory space is used, the content of the occupied memory space 113 should exist physically. For example, the block B001 of the file system directory 112 records corresponding relationship for a data stored in blocks B101 to B104. If one URL is requested to access the data, the data in the block B001 will feedback block numbers of B101 to B104 to the operating system 231 so that the operating system 231 will try to fetch the data in the blocks B101 to B104. The data must be a full and existing one in the blocks B101 to B104. Similarly, the block B004 feedbacks blocks B127 to block B143. The block B024 feedbacks blocks B179 and B180 if corresponding URLs request.

It should be noticed that the script language is not limited to Java script. It can be a language used by HTML5 (Hyper Text Markup Language 5) in the near future. The USB connector 130 is not only limited to use USB or E-SATA connector. For example, a SD card slot, a LIGHTING connector or a THUNDERBOLT connector can be used depending on the operating system. The portable device is not restricted to the fingerprint FLASH disk 100. It can be a FLASH disk, a hard drive, a fingerprint reader or other devices needing operation via such read-only system. Of course, the corresponding service should be changed accordingly. For example, for a FLASH disk, the service may be locking of accessing, providing an ECC function, etc.

In another embodiment, the host can be a desktop, a tablet or a smart phone. In the case of the table and smart phone, connection between the host and the portable device is not wired connection. Such products can adopt wireless connection. Preferably, the wireless connection conforms to the specification of WI-FI or BLUETOOTH. The display unit should be a touch screen, a general purpose screen or even a remotely linked monitor. The host side can include an input device for selecting the option property. A mouse or a keyboard can be applied for the laptop computer 200. A touch screen is an option for a portable device such as a tablet.

Figure 8:
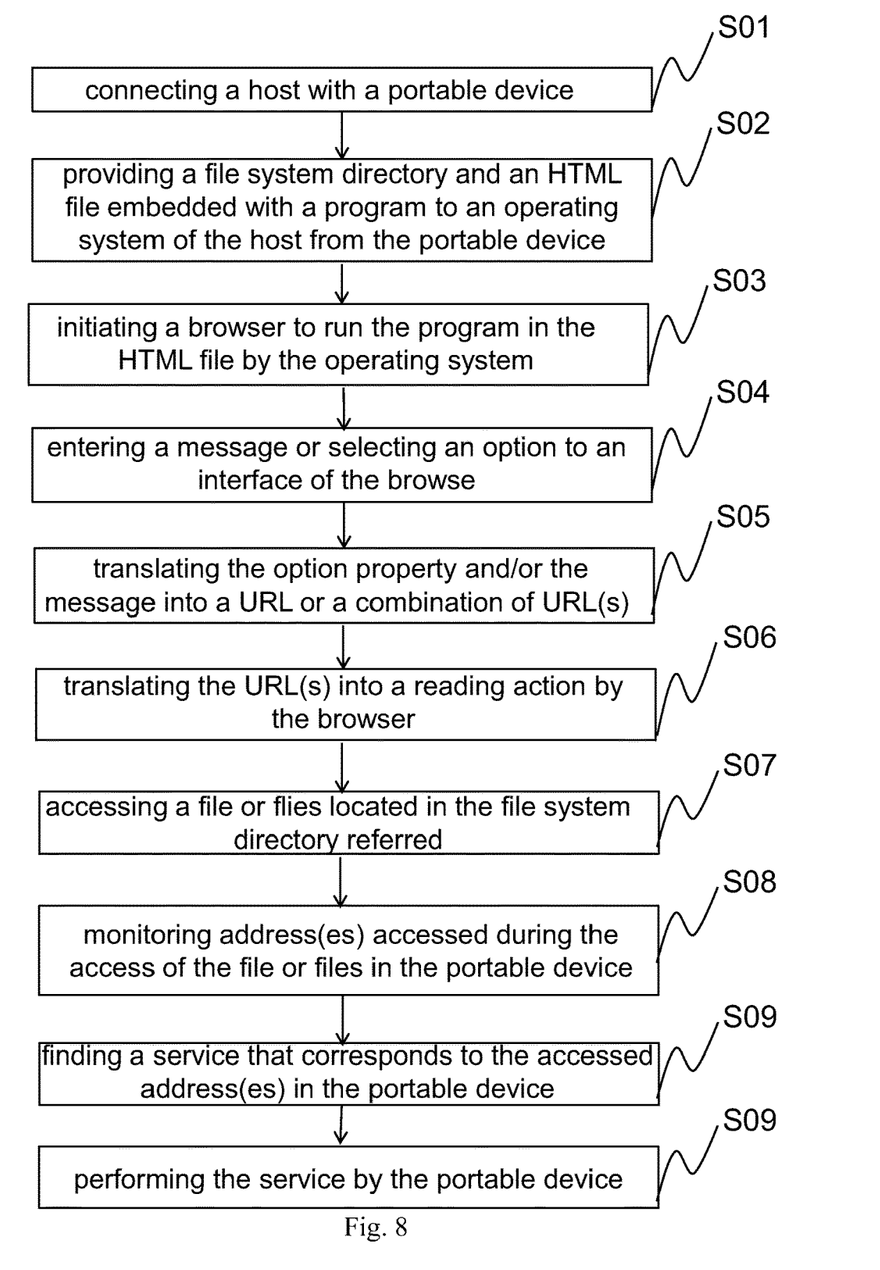
FIG. 8 is a flow chart of a read-only method according to the present invention.

According to the above mentioned description, a general read-only method to achieve the same effect of the read-only system 10 can be summarized as below. Please refer to FIG. 8. First, connect a host (e.g. the fingerprint FLASH disk 100) with a portable device (e.g. the laptop computer 200) (S01). Then, provide a file system directory and an HTML file embedded with a program to an operating system of the host from the portable device (S02). The operating system initiates a browser to run the program in the HTML file by the operating system (S03). Thus, the browser will provide an interface for users. An option property (or message) is inputted to an interface of the browser (S04). As mentioned above, the option property may be selected from a list of options or manually keyed in. The program translates the option property (and/or message) into a URL or a combination of URL(s) (S05). The browser translates the URL(s) into a reading action (S06). Following, the OS accesses a file or flies located in the file system directory referred by one URL or URLs by seeking one address of the file or addresses of the files in an index table of the file system directory and then requesting the portable device to read data at that address (S07). A monitoring program may be used to monitor the address(es) accessed during the access of the file or files in the portable device (S08). By finding a service that corresponds to the accessed address(es) in the portable device (S09), the portable device performs the service by the portable device (S10).

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A read-only method for operating a portable device, comprising the steps of:
   connecting a host with a portable device which has a physical memory space and a virtual memory space;
   providing a file system directory and a Hyper Text Markup Language (HTML) file embedded with a program to an operating system of the host from the portable device;
   initiating a browser to run the program in the HTML file by the operating system;
   entering a message or selecting an option to an interface of the browser;
   translating the option property and/or the message into a URL or a combination of URL(s);
   translating the URL(s) into a reading action by the operating system;
   issuing a file access request by the operating system to the portable device;
   determining whether the file access request is to access files located in the physical memory space or the virtual memory space;
   delivering the requested file(s) to the host in response to determining the file access request is to access files stored in the physical memory space; and
   performing a service by the portable device in response to determining the file access request is to access files stored in the virtual memory space.

2. A read-only system for operating a portable device, comprising:
   a host, comprising:
       a display, wherein web pages are shown on a browser or results of an application file are displayed by the display; and
       a first processor, having an operating system running thereon, wherein the browser or the application file is processed by the first processor,
   a portable device, linked to the host, comprising:
       a memory, having a physical memory space, a virtual memory space, a file system directory which contains an index table of addresses of files stored in the physical memory space and the virtual memory space, and a Hyper Text Markup Language (HTML) file embedded with a program or the application file embedded with or referring to an operation; and
       a second processor, wherein the HTML file or the application file is transmitted from the memory to the host by the second processor which has a monitoring program running thereon, and the second processor performs a service in response to a request of the monitoring program;
   wherein the host deems the portable device as a local drive that the file system directory indicates; the browser displays contents of the HTML file and executes the program embedded in the HTML file; the program or the application file translates an option property selected or a message entered by a user for the service to a corresponding Uniform Resource Locator (URL) or a combination of URLs that refers to addresses of files listed in the index table of the file system directory; the monitoring program determines whether a file access request issued from the operating system is to files located in the physical memory space or the virtual memory space; and the monitoring program informs the second processor to carry out the service in response to determining the file access request is to access files stored in the virtual memory space and informs the second processor to deliver the requested file(s) to the host in response to determining the file access request is to access files stored in the physical memory space.

3. The read-only system according to claim 1, wherein the file system directory is File Allocation Table (FAT), File Allocation Table 16 (FAT16), File Allocation Table 32 (FAT32), Extended File Allocation Table (exFAT), New Technology File System (NTFS), Second Extended File System (ext2), Third Extended File System (ext3), Fourth Extended File System (ext4), Hierarchical File System (HFS), Hierarchical File System X (HFSX), or ISO 9660.

4. The read-only system according to claim 1, wherein the index table of the file system directory is File Allocation Table in FAT file system, index node (inode) in Extended file system, or Master File Table in NTFS.

5. The read-only system according to claim 1, wherein the monitoring program has a preset table or rule that relates the addresses to the corresponding services.

6. The read-only system according to claim 1, wherein the program or application runs to interact with the user for taking the selection or entered message.

7. The read-only system according to claim 1, wherein the option property is shown in the web browser in form of an option button, a check box or a drop-down menu.

8. The read-only system according to claim 1, wherein the option property is shown in the web browser in form of a piece of image which can trigger one specified service if it is clicked on.

9. The read-only system according to claim 1, wherein the message is inputted from a text input field on the web browser.

10. The read-only system according to claim 1, wherein the service, through which the portable device receives and executes command/message from the user, comprises initializing the portable device, configuring the portable device, performing an action of the portable device, providing a piece of message to the portable device or cutting-off the connection with the host.

11. The read-only system according to claim 1, wherein the portable device is linked to the host via a wireless or wired connection.

12. The read-only system according to claim 1, wherein the host is a desktop computer, a laptop computer, a tablet or a smart phone.

13. The read-only system according to claim 1, wherein the display is a monitor, a screen or a touch screen.

14. The read-only system according to claim 1, wherein the host further comprises an input device for selecting the service option.

15. The read-only system according to claim 14, wherein the input device is a mouse, a keyboard or a touch screen.

* * * * *